(12) United States Patent
Ramakrishnan et al.

(10) Patent No.: US 10,608,692 B1
(45) Date of Patent: Mar. 31, 2020

(54) DUAL RECEIVERS FOR ADVERTISEMENT SCANS

(71) Applicant: Amazon Technologies, Inc., Seattle, WA (US)

(72) Inventors: Sameet Ramakrishnan, Saratoga, CA (US); Ravi Ichapurapu, Morgan Hill, CA (US); Ganesha Batta, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/196,046

(22) Filed: Nov. 20, 2018

(51) Int. Cl.
*H04B 1/46* (2006.01)
*H04B 1/48* (2006.01)
*H04W 48/10* (2009.01)
*H04B 1/16* (2006.01)

(52) U.S. Cl.
CPC ............... *H04B 1/48* (2013.01); *H04B 1/16* (2013.01); *H04W 48/10* (2013.01)

(58) Field of Classification Search
CPC ............ H04B 1/48; H04B 1/16; H04W 48/10
USPC .......................................................... 455/82
See application file for complete search history.

(56) References Cited

U.S. PATENT DOCUMENTS

| | | | |
|---|---|---|---|
| 9,294,904 B2* | 3/2016 | Sandblad | H04W 4/023 |
| 9,386,075 B2* | 7/2016 | Adriazola | G06F 8/61 |
| 9,693,014 B2* | 6/2017 | Du | H04L 12/1813 |
| 9,948,367 B2* | 4/2018 | Abraham | H04B 7/0452 |
| 10,027,452 B2* | 7/2018 | Cordeiro | H04W 36/06 |
| 2009/0132668 A1* | 5/2009 | Coletrane | H04L 29/12783 709/206 |
| 2011/0141892 A1* | 6/2011 | Gong | H04W 4/08 370/235 |
| 2011/0149731 A1* | 6/2011 | Gong | H04W 72/121 370/235 |
| 2011/0149918 A1* | 6/2011 | Gong | H04W 72/005 370/336 |
| 2011/0149941 A1* | 6/2011 | Gong | H04B 7/0634 370/343 |
| 2013/0336248 A1* | 12/2013 | Cordeiro | H04W 36/06 370/329 |
| 2015/0071288 A1* | 3/2015 | Ayandeh | H04L 49/357 370/392 |
| 2016/0080380 A1* | 3/2016 | Dawoud Shenouda Dawoud | H04L 63/0876 713/156 |
| 2017/0017484 A1* | 1/2017 | Elmoalem | G06F 8/65 |
| 2019/0020744 A1* | 1/2019 | Dong | H04L 69/22 |

* cited by examiner

*Primary Examiner* — April G Gonzales
(74) *Attorney, Agent, or Firm* — Lowenstein Sandler LLP

(57) ABSTRACT

Technologies for improving airtime for advertisement packet scanning are described. One apparatus includes a processing device, a memory device, a first radio, a second radio, and a single media access control (MAC) device coupled to the first radio and the second radio. The single MAC device assigns a single MAC address to the first radio and the second radio. The first radio receives first data and the second radio received second data and stores the second data in the memory device. The single MAC device processes the first data received from the radio and processes the second data retrieved from the memory device.

20 Claims, 7 Drawing Sheets

DUAL RECEIVERS FOR ADVERTISEMENT SCANS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
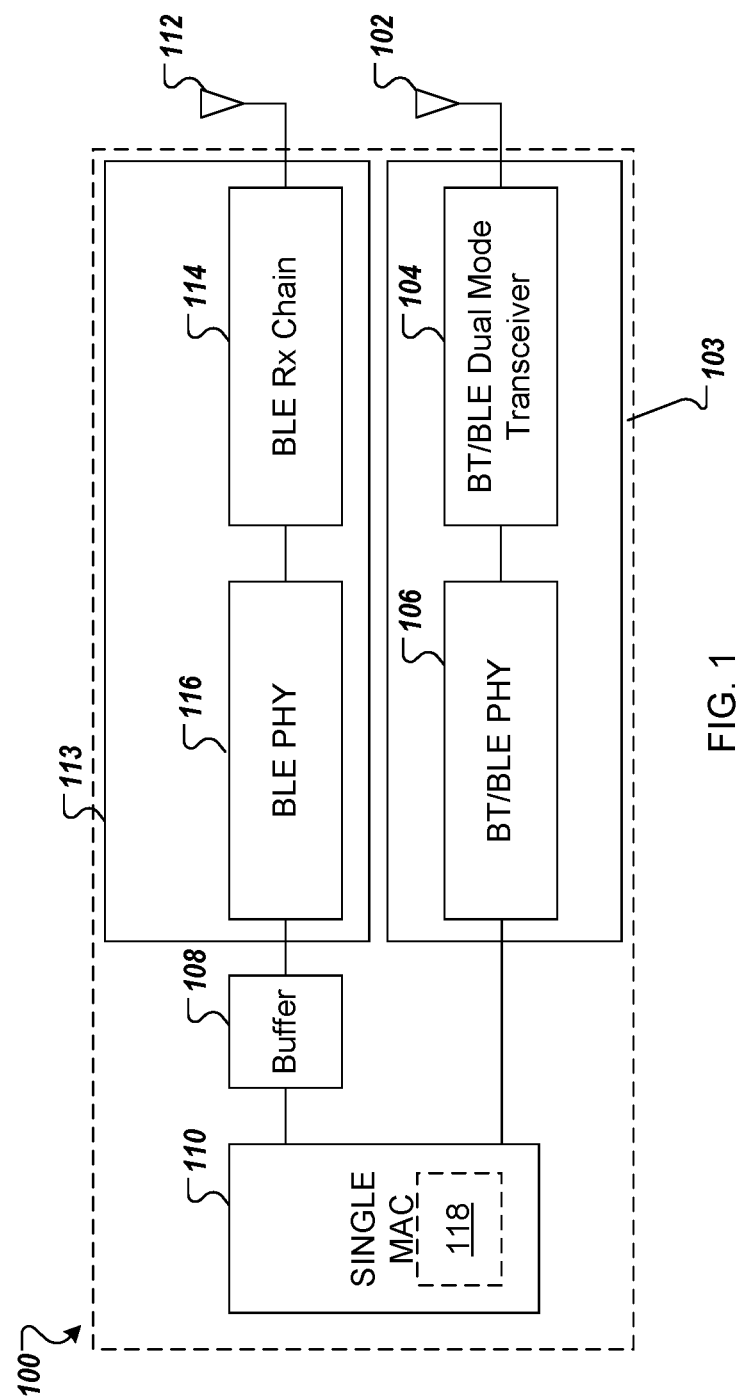
FIG. 1 is a block diagram of an electronic device having a single media access control (MAC) device, a first radio, a second radio, and two antennas according to one embodiment.

Technologies for improving airtime for advertisement packet scanning are described. The 2.4 GHz industrial, scientific, and medical (ISM) radio band allows unlicensed wireless communications. Due to its unlicensed nature, many short ranged, low power wireless communication systems operate in this frequency band. Since these radios occupy the same spectrum, careful designs are required to prevent interference between one another, often at the cost of reduced throughput or range for the radios. To support multiple radios operating in the same frequency band on compact devices, the conventional implementations use time-switched architectures. In this architecture, a single radio can transmit or receive at any given time, and there is no performance degradation due to inter-radio interference during this time slot, referred to as Packet Traffic Arbitration. PTA makes the radios coexist by letting one radio operate at a time. Time-sharing between the WLAN and PAN radios becomes a fine balance between latency, reliability, and quality of the features, leaving little headroom for any new features to improve customer experience. In the case of offloaded dongle design, the extra cost associated with separate dongle can significantly be reduced when the PAN radio is implemented on the same printed circuit board (PCB) as the WLAN radio. Also, PTA has poor data throughput and higher latency because of the need to switch between the two radios. In addition, there are features such as Whole Home Audio (WHA) that requires significant amount of the WLAN transmission (e.g., the Wi-Fi® transmission), Smart Home security monitoring that requires listening to a personal area network (PAN) radio (e.g., ZigBee® endpoints or BLE radios) at all time for low latency and high reliability, and Frustration Free Setup (FFS) would like to have the PAN radio to be constantly scanning for new devices. For example, there are many uses cases, such as FFS, BLE mesh, and presence detection that require a personal area network (PAN) radio with the Bluetooth® Low Energy (BLE) technology to continuously scan the medium to receive advertisements from other devices. The scanning for advertisements using the BLE technology is referred to as BLE scans and the advertisements may be in the form of advertisement packets. The advertisement packets include data that identifiers a transmitting device, such as a name of the device, an identifier of the device, or the like. Although various embodiments describe scanning for advertisement packets, in general, the embodiments can be used for other listening activities, such as listening for beacon frames, discovery frames, discovery packets, or other information used to allow devices to discover one another. The scan duty cycle that can be allocated to the BLE scans may be limited by the activity by the WLAN activity and PAN activity by Bluetooth® Classic technology because the Bluetooth® Classic (BT Classic) communications share a radio with the BLE communications. For example, a problematic case is a phone that is trying to scan on BLE while the phone is also receiving data on Bluetooth® classic and distributing the data as an audio distribution master in a Whole Home Audio group (e.g., WiFi® Tx+A2DP Sink). Using conventional PAN radios, this scenario allows 0-15% of the airtime for BLE scans, where upwards of 50% is desired.

In the architectures and technologies described herein, two radios can be used with a single MAC device, where one radio is used for wireless communications and the other radio is used for scanning for advertisements, such as continuous BLE scans. The single MAC device may also be referred to as a shared MAC device, since it is shared between the two radios. In general, the radio architecture includes 1) a single MAC device shared between multiple PHY layer devices (also referred to as PHYs); 2) a first PHY layer device and a second PHY layer device both coupled to the single MAC device; 3) a single MAC address between the two radios/PHYs (also referred to as shared MAC address; and 4) a transceiver coupled to the first PHY layer device and a receiver coupled to the second PHY layer device. The second PHY layer device may consume less power than the first PHY layer device. In one implementation, the first PHY layer device is a BT/BLE dual-mode PHY and the second PHY layer device is a BLE PHY. BT/BLE dual-mode indicates a device that is capable of processing data from both the Bluetooth® standard and the Bluetooth®

Low Energy standard, as the two technology standards use different protocols and are thus incompatible. The transceiver may be a BT/BLE dual-mode transceiver and the receiver is a BLE Rx-only chain. Alternatively, the first and second PHY layer devices may be other types of PHYs. In these embodiments, a memory buffer is coupled between the single MAC device and the second PHY layer device to store the data received by the second PHY layer device. This allows the single MAC device to process two streams of data according to a priority scheme. For example, when the first PHY layer device is idle, the single MAC device may process the stream of data stored in the memory buffer. This architecture can built with two separate antennas, one antenna per each physical layer device. Alternatively, this architecture can be built with a single antenna coupled to each of the two physical layer devices. A switch can be used to power off the second physical layer device in some modes, such as when the transceiver is transmitted data or when another WLAN radio is transmitting data.

In other radio architectures, instead of a memory buffer, a listen offload device is coupled between a link layer device and the second radio (e.g., second physical layer device). The listen offload device can process the data similar to the MAC device, but in only one direction—the receive path. In this architecture, the MAC device process data from the first physical layer device, and not the data from the second physical layer device. The link layer device receives data from the listen offload device and data from the MAC device.

One apparatus includes a processing device, a memory device, a first radio, a second radio, and a single MAC device coupled to the first radio and the second radio. The single MAC device assigns a single MAC address to the first radio and the second radio. The first radio receives first data and the second radio received second data and stores the second data in the memory device. The first data can include audio/video (AV) content or other type of data, whereas the second data includes one or more advertisement packets, including data that identifies a device broadcasting the advertisement packets. The single MAC device processes the first data received from the radio and processes the second data retrieved from the memory device.

The antennas and radios described herein can be used for WLAN technologies (e.g., Wi-Fi® technologies), PAN technologies (e.g., Bluetooth® and Zigbee® technologies), wireless area network (WAN) technologies, such as cellular technologies including Long Term Evolution (LTE) frequency bands, third generation (3G) frequency bands, global navigation satellite system (GNSS) frequency bands (e.g., global positioning system (GPS) frequency bands), or the like. Although various embodiments describe the Bluetooth® and BLE technologies, in other embodiments, the two radios (e.g., two PHY layer devices) may be implemented using other PAN technologies, such as the Zigbee® technology. Similarly, the two radios (e.g., two PHY layer devices) can be implemented in other wireless technologies, such as the Wi-Fi® technology, LTE, 3G WAN technologies, or the like.

FIG. 1 is a block diagram of an electronic device 100 having a single MAC device 110, a first radio 103, a second radio 113, and two antennas 102, 112 according to one embodiment. The electronic device 100 may be a consumer electronic device that is portable or stationary. A first antenna 102 is coupled to the first radio 103. The first radio 103 includes a transceiver 104 and a first physical (PHY) layer device 106. The transceiver 104 may be a dual-mode transceiver that implements with the Bluetooth® technology in a first mode and the BLE technology in a second mode. The first PHY layer device 106 may include a dual-mode PHY layer device that implements the Bluetooth® technology in the first mode and the BLE technology in the second mode. The first radio 103 is coupled to the single MAC device 110. A second antenna 112 is coupled to the second radio 113. The second radio 113 includes a receiver 114 and a second PHY layer device 116. The receiver 114 may be a receiver that implements the BLE technology. For example, the receiver 114 can include a BLE RX chain, including at least a low noise amplifier (LNA). The second PHY layer device 116 may include a PHY layer device that implements the BLE technology. In other embodiments, the first PHY layer device 106 is a first type of PHY layer device and the second PHY layer device is a second type of PHY layer device that consumes less energy than the first type of PHY layer device. The second radio 113 is coupled to a memory buffer device 108. The memory buffer device 108 may be any type of memory or storage technology. The memory buffer device 108 may implemented as a standalone memory device, as part of the memory of the second radio 113, as part of the memory of the single MAC device 110, or as part of the memory of the processing device. The memory buffer 108 is coupled to the single MAC device 110.

During operation, the transceiver 104 receives first RF signals via the first antenna 102 and the first PHY layer device 106 processes the first RF signals to obtain first data. The first data can include one or more data packets of content. The receiver 114 also receives second RF signals via the second antenna 112 and the second PHY layer device 116 processes the second RF signals to obtain second data. The second data includes one or more advertisement packets or advertisement frames that are broadcast by one or more other devices. The second PHY layer device 116 stores the second data in the memory buffer device 108. The single MAC device 110 assigns a single MAC address to the first PHY layer device 106 and the second PHY layer device 116. The single MAC device 110 receives the first data directly from the first PHY layer device 106 and reads the second data from the memory buffer device 108, instead of directly from the second PHY layer device 116. This can allow the single MAC device 110 to process the first data with higher priority than the second data. The single MAC device 110 can process the second data when the single MAC device 110 is not busy processing the first data. In this manner, the single MAC device 110 can still process the advertisement packets received from the second PHY layer device 116, while maintaining communications via the first PHY layer device 106. In one embodiment, the first data is one or more packets of a first stream of data. The first stream can be assigned a higher priority for processing by the single MAC device 110. The second data is one or more packets of a second stream of data. This second stream of data is stored in the memory buffer device 108 to allow the single MAC device 110 to process the second stream according to a priority scheme or when the single MAC device 110 is idle from processing the first stream.

In some embodiments, the single MAC device 110 includes a scheduler 118 to schedule processing of the two streams of data from the respective radios. In one embodiment, the scheduler 118 enables the first radio 103 to receive and process first RF signals during a first time window to obtain the first data (also referred to as PAN sink) and to scan for advertisement packets during a second time window (also referred to as BLE scans). The scheduler 118 enables the second radio 113 to scan for the advertisement packets during the first time window (BLE scans) and the second time window (BLE scans) to obtain the second data. As noted above, the second data includes one or more advertisement packets. By enabling the second radio 113 to scan for advertisement packets in both windows, the scheduler 118 can be said to permit continuous BLE scans. In some cases, the scheduler 118 can disable the second radio 113 from scanning for advertisement packets, such as during a transmission window by the first radio 103, during a transmission window by another radio of the electronic device, such a WLAN radio (e.g., Wi-Fi® transmission window). The scheduler 118 schedules the first data, received from the first radio, to be processed according to a first priority and schedules the second data to be retrieved from the memory buffer device 108 and processed by the single MAC device 110 according to a second priority that is lower than the first priority. In this embodiment, the first radio 103 can receive a first signal from the scheduler 118. In response to the first signal, the first radio 103 processes first RF signals during a first time window to obtain the first data and scans for advertisement packets during a second time window. The second radio 113 can receive a second signal from the scheduler 118. In response to the second signal, the second radio 113 scans for the advertisement packets during the first time window and the second time window to obtain the second data. The single MAC device 110 is configured to process the first data received from the first radio 103 according to a first priority and process the second data retrieved from the memory buffer device 108 according to a second priority that is lower than the first priority.

In another embodiment, the scheduler 118 enables the first radio 103 to receive and process first RF signals during a first time window to obtain the first data and to scan for advertisement packets during a second time window and enables the second radio 113 to scan for the advertisement packets during the first time window and the second time window to obtain the second data. The scheduler 118 also enables the first radio 103 to transmit third RF signals during a third time window (e.g., PAN transmission window or PAN Tx). The scheduler 118 disables the second radio 113 from scanning for the advertisement packets during the third time window. The scheduler 118 schedules the first data and second data to be processed similar to the embodiment described above. The scheduler 118 also schedules the processing of third data for the third RF signals transmitted during the third time window. In this embodiment, the first radio 103 can receive a first signal from the scheduler 118 and a second signal from the scheduler 118. In response to the first signal, the first radio 103 processes first RF signals during a first time window to obtain the first data and scans for advertisement packets during a second time window. In response to the first signal, the first radio 103 can transmit third RF signals during a third time window. The second radio 113 can receive a third signal from the scheduler 118 and can receive a fourth signal from the scheduler 118. In response to the third signal, the second radio 113 scans for the advertisement packets during the first time window and the second time window to obtain the second data. In response to the fourth signal, the second radio 113 disables scanning for the advertisement packets during the third time window. The single MAC device 110 is configured to process the first data received from the first radio 103 according to a first priority and process the second data retrieved from the memory buffer device 108 according to a second priority that is lower than the first priority.

In another embodiment, the scheduler 118 receives a target scan duty cycle value from a host device. The scheduler 118 enables the first radio 103 to receive and process first RF signals during a first time window to obtain the first data and to scan for advertisement packets during a second time window. The scheduler 118 enables the second radio 113 to scan for the advertisement packets during a first portion of the first time window and during the second time window to obtain the second data and disable the second radio 113 from scanning for the advertisement packets during a second portion the first time window. The size of the first portion and the second portion depends on the target scan duty cycle value. For example, the target scan duty cycle value is equal to a percentage of time of the first portion of the first time window and the second time window. In this manner, the host device can maintain a scan duty cycle for scanning for advertisement packets by the second radio 113. The scheduler 118 schedules the first data and second data to be processed similar to the embodiment described above. In this embodiment, the first radio 103 can receive a first signal from the scheduler 118. In response to the first signal, the first radio 103 processes first RF signals during a first time window to obtain the first data and scans for advertisement packets during a second time window. The second radio 113 can receive a second signal from the scheduler 118 and can receive a third signal from the scheduler 118. In response to the second signal, the second radio 113 scans for the advertisement packets during the first time window and the second time window to obtain the second data. In response to the third signal, the second radio 113 disables scanning for the advertisement packets during a second portion of the first time window. The single MAC device 110 is configured to process the first data received from the first radio 103 according to a first priority and process the second data retrieved from the memory buffer device 108 according to a second priority that is lower than the first priority.

In one embodiment, the scheduler 118 can read a register value or a state of a third radio of the electronic device 100 to determine when the third radio is transmitting data in order to disable the second radio 113, and in some cases, disable the first radio 103.

Although the first radio 103 and the second radio 113 are described above as PAN radios, such as a first PAN radio that implements a dual-mode PAN transceiver and a dual-mode PAN PHY layer device and a second PAN radio that implements a PAN receiver and a PAN PHY layer device (e.g., BLE PHY layer device), in other embodiments, other wireless technologies may be used. For example, the first radio 103 can be a first WLAN radio with a transceiver and a first WLAN PHY layer device and the second radio can be a second WLAN radio with a receiver and a second WLAN PHY layer device. The second WLAN PHY layer device can scan for beacons, advertisement packets, advertisement frames, or the like, while the first WLAN PHY layer device can send and receive WLAN data.

In one embodiment, the first radio 103 is a first integrated circuit and the second radio 113 is a second integrated circuit. In another embodiment, the first radio 103 and the second radio 113 can be implemented in the same integrated circuit. In another embodiment, a processing device (not illustrated in FIG. 1), the memory buffer device 108, the first radio 103, the second radio 113, and the single MAC device 110 is implemented in an integrated circuit, such as a System on Chip (SoC). In a further embodiment, the integrated circuit or SoC can also include a WLAN MAC device coupled to the processing device, a WLAN physical layer device coupled to the WLAN MAC device, and a WLAN transceiver coupled to the WLAN physical layer device. Alternatively, the one or more integrated circuits may include more or less components, as well as additional radios using other wireless technologies. It should be noted that the electronic device 100 of FIG. 1 does not illustrate and described additional components, such as a link layer device, an application processor (also referred to a host device or host processor), system memory, input-output devices, or the like.

In the depicted embodiment, the first antenna 102 is coupled to the first radio 103 (e.g., transceiver 104) to receive and transmit RF signals and the second antenna 112 is coupled to the second radio 113 (e.g., receiver 114) to receive RF signals. In other embodiments, a single antenna can be shared between the first radio 103 and the second radio 113, such as illustrated in FIG. 2.

Figure 2:
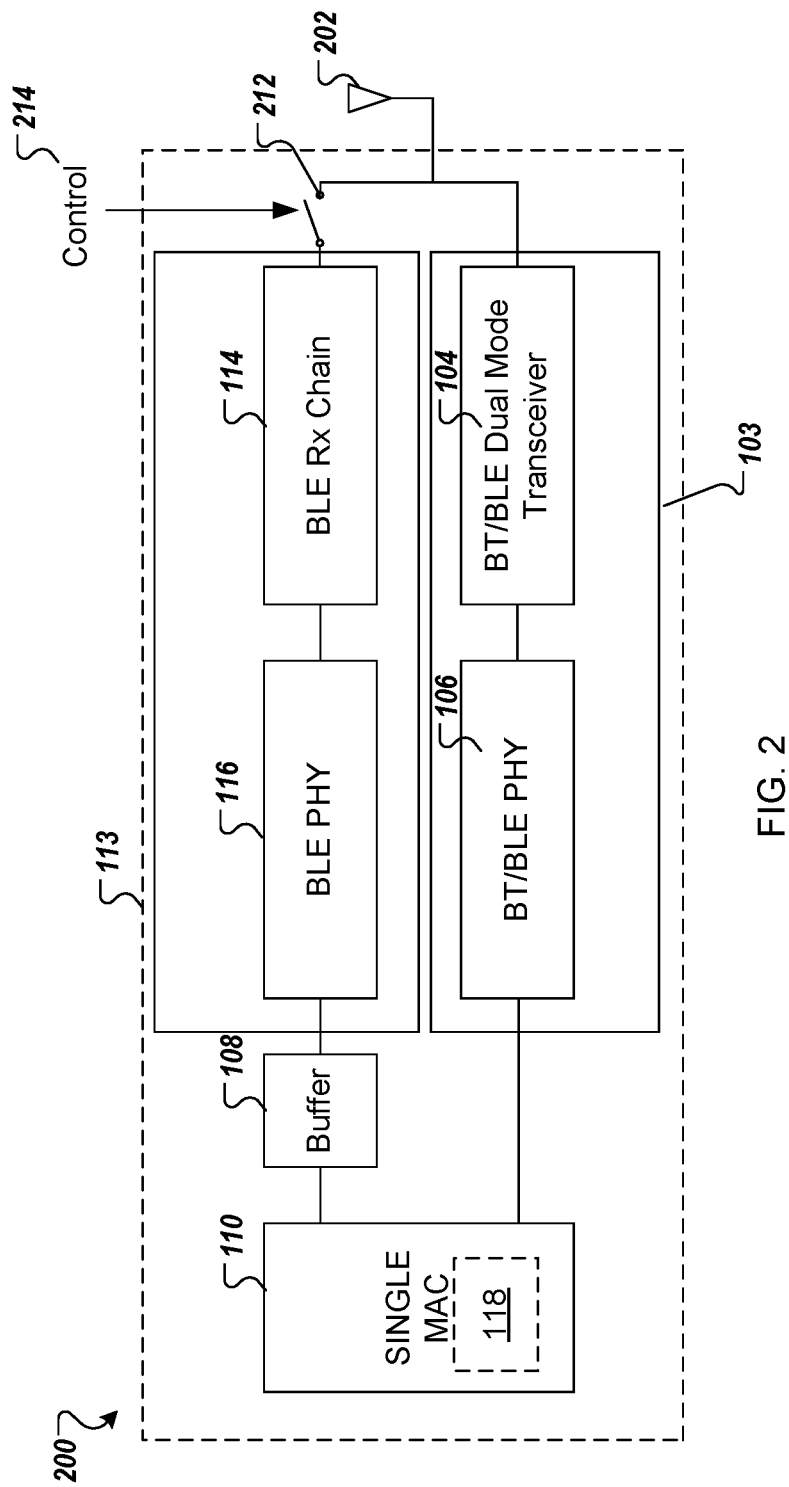
FIG. 2 is a block diagram of an electronic device having a single MAC device, a first radio, a second radio, and a single antenna according to one embodiment.

FIG. 2 is a block diagram of an electronic device 200 having a single MAC device, a first radio, a second radio, and a single antenna according to one embodiment. The electronic device 200 is similar to the electronic device 100 of FIG. 1 as noted by similar reference numbers, except where expressly noted. The electronic device 200, unlike the electronic device 100, is coupled to a shared antenna 202 and includes a switch 212. The switch 212 is coupled to the shared antenna 202 and selectively couples the shared antenna 202 to the second radio 113 (e.g., PAN receiver 114). The switch 212 can be controlled by a control signal 214. The control signal 214 can originate from the processing device (not illustrated in FIG. 2), from the single MAC device 110, the scheduler 118, or from other control sources, such as a state stored in a register of the electronic device. The control signal 214 can be used to select between a first state and a second state of the switch 212. The switch 212, when controlled to be in a first state, enables the PAN receiver 114 to receive the second RF signals via the shared antenna 202. The PAN transceiver 104 also receives the first RF signals via the shared antenna 202. The first RF signals and the second RF signals may be the same signals and the second PHY layer device 116 can process the RF signals for the advertisement packets in the RF signals and the first PHY layer device 106 can process the RF signals for data packets in the RF signals. The switch, when controlled to be in a second state by the processing device, disables the PAN receiver 114 from receiving the second RF signals via the shared antenna 202, enabling the PAN transceiver 104 to transmit third RF signals via the shared antenna 202. The first state and second state of the switch 212 can correspond to two modes of operation, including a first mode in which the second radio 113 is enabled to scan for advertisement packets concurrently with the first radio 103 communicating data and a second mode in which the second radio 113 is disabled from scanning for the advertisement packets. This may be when the first radio 103 or one or more other radios are scheduled to transmit data.

Figure 3:
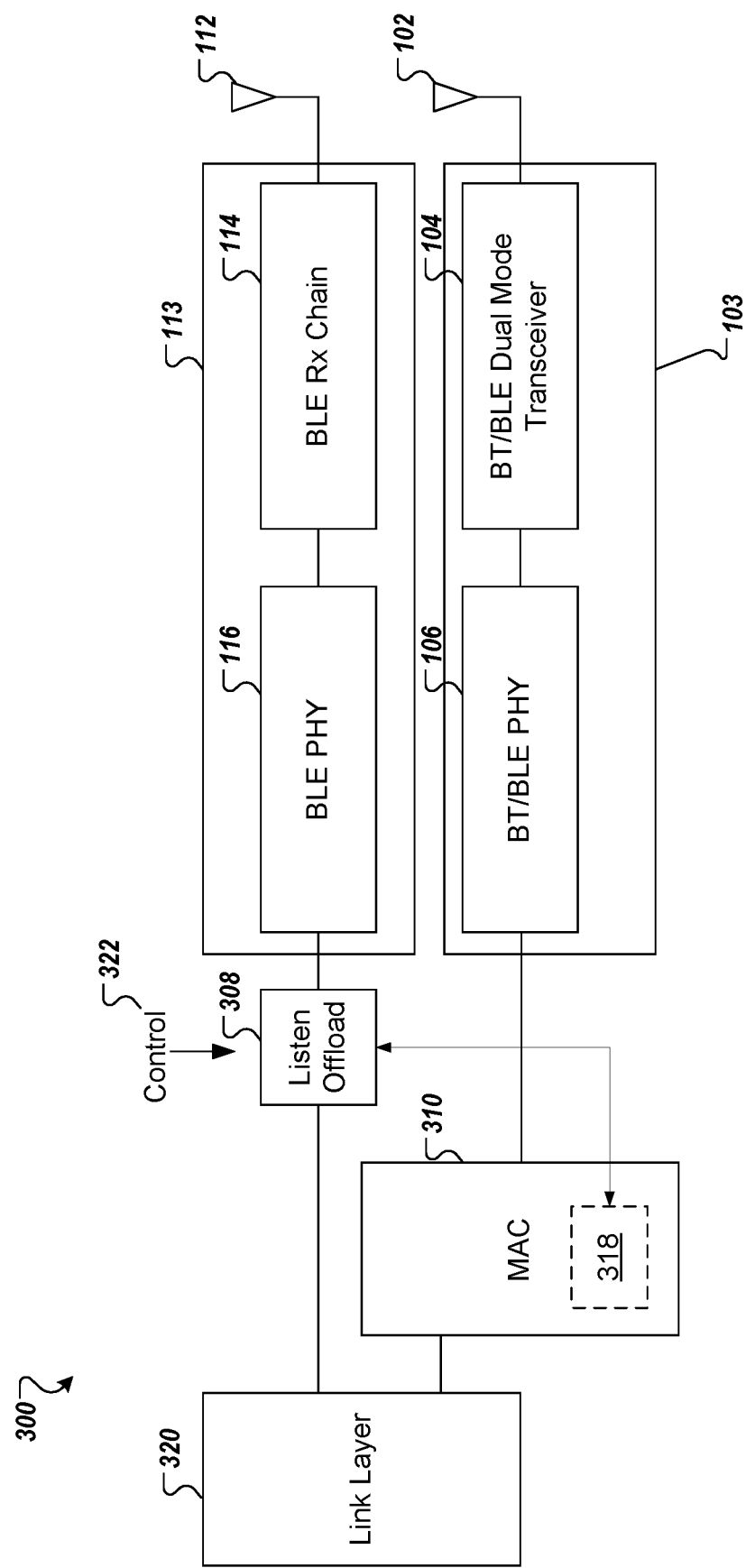
FIG. 3 is a block diagram of an electronic device having a listen offload device according to one embodiment.

FIG. 3 is a block diagram of an electronic device 300 having a listen offload device 308 according to one embodiment. The electronic device 300 is similar to the electronic device 100 of FIG. 1 as noted by similar reference numbers, except where expressly noted. The electronic device 300, unlike the electronic device 100, includes the listen offload device 308 is coupled between a link layer device 320 and the second radio 113 (e.g., second PHY layer device 116). A MAC device 310 is coupled between the link layer device 320 and the first radio 103 (e.g., first PHY layer device 106).

During operation, the second radio 113 can send the second data to the listen offload device 308, instead of storing the second data in a memory buffer device. The MAC device 310 is configured to process the first data received from the first radio 103 and the listen offload device 308 is configured to process the second data received from the second radio 113. The listen offload device 308 can perform similar operations as the MAC device 310, but for receive data only. The MAC device 310 can handle processing receive data and transmit data. Since the listen offload device 308 can process the second data in a similar manner as a MAC device, the second data processed by the listen offload device 308 can be passed to the link layer device 320 directly without passing through the MAC device 310. In contrast, the MAC device 310 can process the first data received from the first radio 103 and the first data processed by the MAC device 310 can be passed to the link layer device 320. Conventionally, a single link layer device is coupled to a single MAC device. The electronic device 300, in contrast, includes the link layer device 320 that is configured to process data received from the MAC device 310, as well as data received from listen offload device 308. In general, the link layer device 320 can transfer data between nodes on the same layer of the network, detect and optionally correct errors that occur in the physical layer, and/or provide mechanisms to reduce or prevent collusions of frames. Since the second radio 113 is not coupled to the MAC device 310, the second radio 113 may not be assigned a single MAC address with the first radio 103. For example, the listen offload device 308 (or other device) can assign a MAC address to the second radio 113 that is different than the MAC address of the first radio 103. In other cases, the second radio 113 may still be assigned a MAC address that is shared between the first radio 103 and the second radio 113.

In one embodiment, the listen offload device 308 can be controlled by one or more control signals 322. For example, a host device can enable or disable the listen offload device 308, along with the second radio 113 when the first radio 103 or another radio in the electronic device 300 is transmitting data.

In one embodiment, the listen offload device 308 includes a scheduler, similar to the scheduler 118 of FIG. 1. Alternatively, the listen offload device 308 is coupled to a scheduler 318 in the MAC device 310. The scheduler 318 can control the listen offload device 308, such as to control when the listen offload device 308 is enabled or disabled. In one embodiment, the listen offload device 308 enables the second radio 113 to scan for the advertisement packets during a first time window (BLE scans) in which the first radio 103 is configured to receive and process first RF signals and during a second time window (BLE scans) in which the first radio 103 is configured to scan for the advertisement packets to obtain the second data. As noted above, the second data includes one or more advertisement packets. By enabling the second radio 113 to scan for advertisement packets in both windows, the listen offload device 308 can be said to permit continuous BLE scans. In some cases, the listen offload device 308 can disable the second radio 113 from scanning for advertisement packets, such as during a transmission window by the first radio 103, during a transmission window by another radio of the electronic device, such a WLAN radio (e.g., Wi-Fi® transmission window). Since the MAC device 310 is not shared between the first radio 103 and the second radio 113, the listen offload device 308 can process the second data received from the second radio 113 and the MAC device 310 can process the first data received from the first radio 103 without any priority scheme.

In another embodiment, the listen offload device 308 enables the second radio 113 to scan for the advertisement packets during a first time window (BLE scans) in which the first radio 103 is configured to receive and process first RF signals and during a second time window (BLE scans) in which the first radio 103 is configured to scan for the advertisement packets to obtain the second data. During a third time window (e.g., PAN transmission window or PAN Tx), the first radio 103 can transmit third RF signals. During the third time window in which the first radio transmits the third RF signals, the listen offload device 208 can disable the second radio 113 from scanning for the advertisement packets. Since the MAC device 310 is not shared between the first radio 103 and the second radio 113, the listen offload device 308 can process the second data received from the second radio 113 and the MAC device 310 can process the first data received from the first radio 103 without any priority scheme.

In another embodiment, the listen offload device 308 receives a target scan duty cycle value from a host device, such as via the one or more control signals 322. The listen offload device 308 enables the second radio 113 to scan for the advertisement packets during a first portion of a first time window and during a second time window to obtain the second data and disables the second radio 113 from scanning for the advertisement packets during a second portion the first time window. The size of the first portion and the second portion depends on the target scan duty cycle value. For example, the target scan duty cycle value is equal to a percentage of time of the first portion of the first time window and the second time window. In this manner, the host device can maintain a scan duty cycle for scanning for advertisement packets by the second radio 113. Since the MAC device 310 is not shared between the first radio 103 and the second radio 113, the listen offload device 308 can process the second data received from the second radio 113 and the MAC device 310 can process the first data received from the first radio 103 without any priority scheme.

In one embodiment, the listen offload device 308 can read a register value or a state of a third radio of the electronic device 300 to determine when the third radio is transmitting data in order to disable the second radio 113.

In other embodiments, the scheduler 318 can control the listen offload device 308 to operate in a similar manner as described above, as well as control the first radio 103. That is, the first radio 103 and the second radio 113 can receive corresponding signals from the listen offload device 308 and perform corresponding actions in response to the signals in a similar manner as described above with respect to scheduler 118 of FIG. 1.

In a further embodiment, the electronic device 300 can include a shared antenna and a switch, as described above with respect to FIG. 2, instead of the two antennas illustrated. In these embodiments, the switch can be controlled in similar manners as described above.

Figure 4:
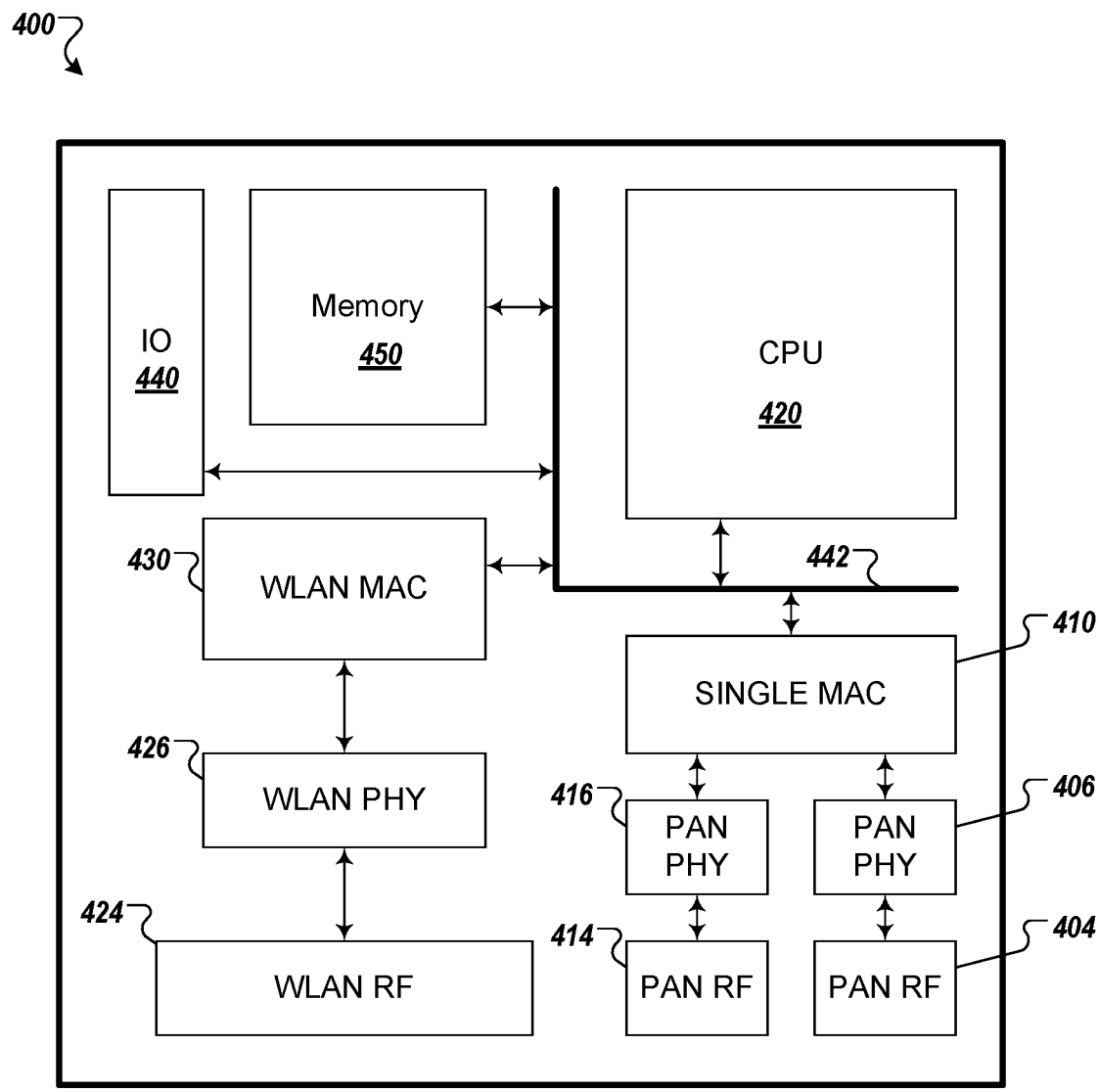
FIG. 4 is a block diagram of a System on Chip (SoC) having two personal area network (PAN) PHY devices coupled to a single MAC device according to one embodiment.

FIG. 4 is a block diagram of a SoC 400 having two PAN PHY devices 406, 416 coupled to a single MAC device 410 according to one embodiment. More specifically, the SoC 400 includes a first PAN RF circuit 404 coupled to a first PAN PHY device 406 and a second PAN RF circuit 414 coupled to a second PAN PHY device 416. The first PAN PHY device 406 and the second PAN PHY device 416 are coupled to the single MAC device 410. The SoC 400 also includes a WLAN RF circuit 424 coupled to a WLAN PHY device 426, which is coupled to a WLAN MAC device 430. The single MAC device 410 and the WLAN MAC device 430 are coupled to a central processing unit (CPU) 420 via one or more interconnects 442 (e.g., buses). The SoC 400 may also include system memory 450 and one or more input-output (IO) devices 440. The system memory 450 and IO devices 440 are coupled to the CPU 420 via the one or more interconnects 442. The SoC 400 may include an additional memory buffer device, such as the memory buffer device 108 described above with respect to FIGS. 1-2 or the listen offload device 308 described above with respect to FIG. 3. As described herein, the PAN PHY device 406 can be a first type of PAN PHY device that implements the Bluetooth® classic technology, and the PAN PHY device 416 can be a second type of PAN PHY device that implements the BLE technology. Alternatively, the PAN RF circuits and PAN PHY devices implement the Zigbee® technology.

In another embodiment, the two PAN PHY devices, and corresponding PAN RF circuits, could be WLAN PHY devices that share the same MAC device, and the WLAN PHY device can be another PHY device that implements another wireless technology.

The electronic devices 100, 200, 300, an electronic device containing the SoC 400, or any other user device with these components may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, audio-input-enabled devices, speech-based personal data assistants, and the like. The electronic device may also be an audio-input-enabled device, such as the Amazon Echo device, developed by Amazon Technologies, Inc. of Seattle Wash. Alternatively, the electronic device may be a set-top box (STB) or other media streaming device. The electronic device may connect to a network to obtain content from a server computing system (e.g., an item providing system) or to perform other activities. The electronic device may connect to one or more different types of cellular networks.

The electronic device includes a circuit board, such as a printed circuit board (PCB) upon which one or more of the components described above is disposed. The components can be integrated into one or more integrated circuits. In some embodiments, the WLAN radio and the PAN radios are separate integrated circuits or chipsets. In one embodiment, the RF radios (or RF modules) reside on a common carrier substrate die of an integrated circuit. In other embodiments, the CPU 420 is disposed on the PCB along with the RF radios and the RF circuits. The CPU 420 is operable to control the RF radios to radiate electromagnetic energy concurrently in a first frequency range (e.g., 2.4 GHz) or a second frequency range (e.g., 5 GHz), or both, via one or more antennas. Alternatively, the CPU 420 can be disposed on another circuit board than the RF radios. Alternatively, the RF radios can be implemented as RF circuitry in a single integrated circuit. In one embodiment, the RF circuitry includes a WLAN radio and PAN radio. In other embodiments, the RF radios may be specific to the frequency bands of interest. The CPU 420 may be an application processor (AP) the implements various operations, including operations to control the operations of the radios of the device. The AP may be used for other operations of the electronic device. In another embodiment, a dedicated microcontroller with digital-to-analog (DAC) pins can be used to control radio operations. In another embodiment, an application-specific integrated circuit (ASIC), a field-programmable gate array (FPGA), or other mixed-signal integrated circuits may be used to control radio operations.

The WLAN radio (WLAN MAC device 430, WLAN PHY device 426, WLAN RF 424) may include two transceivers to operate in a MIMO architecture. The transceiver (and any additional transceivers) of the WLAN radio can operate at 2.45 GHz and may implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wirelessly using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHz, 5 GHz, or both. A first PAN radio, including the first PAN RF circuit 404, the first PAN PHY device 406, and the single MAC device 410, includes a transceiver that also operates at 2.4 GHz and may implement the Bluetooth® technology, BLE technology, dual-mode BT/BLE technology, the Zigbee® technology, or other PAN technologies. A second PAN radio, including the second PAN RF circuit 414, the second PAN PHY device 416, and the single MAC device 410, includes a receiver (or a transceiver that is only used for receiving data) that also operates at 2.4 GHz and may implement the Bluetooth® technology, BLE technology, dual-mode BT/BLE technology, the Zigbee® technology, or other PAN technologies. The WLAN radio and PAN radios can be individual chipsets, even chipsets provided by different vendors. The WLAN radio and the PAN radios may be implemented in the same chipset or on a common carrier substrate with the CPU 420, such as illustrated in the SoC architecture of FIG. 4. In another embodiment, other wireless RF radios may be used to implement other technologies, such as the LTE technology, or the like. For example, the RF circuitry may include other radios, such as a wireless area network (WAN) radio, GNSS radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multimedia messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1xRTT, EVDO, HSDPA, WLAN (e.g., Wi-Fi® network), etc. In the depicted embodiment, the modem can use the RF circuitry to radiate electromagnetic energy on the antennas to communication data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables functionality of both transmission and receiving data using reciprocity.

In one embodiment, the PAN RF circuit 404 is operable to radiate electromagnetic energy via a first antenna in a first frequency range and the PAN RF circuit 414 is operable to radiate electromagnetic energy via a second antenna in the first frequency range concurrently with the PAN RF circuit 404. The PAN RF circuit 404 is operable to radiate electromagnetic energy via a shared antenna in the first frequency range concurrently with the PAN RF circuit 414. Similarly, the WLAN radio can use the Wi-Fi® technology in the 2.45 GHz frequency band and the PAN radios can use the Bluetooth® technology in the 2.4 GHz frequency band concurrently with sufficient isolation between the radios using interference compensation. Alternatively, a switching architecture can be used to share airtime.

Figure 5:
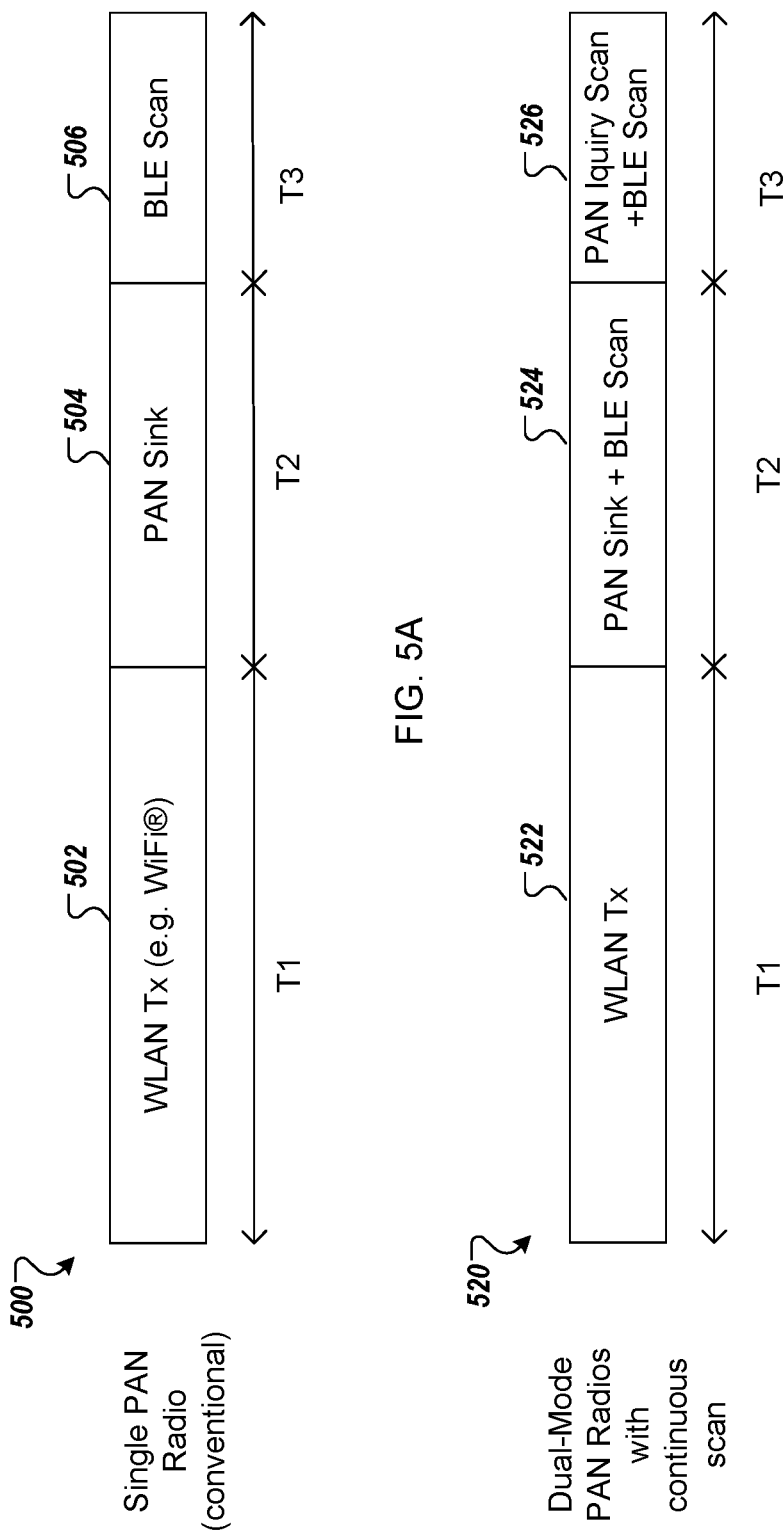
FIG. 5A illustrates a graph of airtime with multiple time windows of a wireless local area network (WLAN) radio and a PAN radio according to one implementation.
FIG. 5B illustrates a graph of airtime with multiple windows of a WLAN radio and two PAN radios with continuous scan according to one embodiment.

FIG. 5A illustrates a graph 500 of airtime with multiple time windows of a wireless local area network (WLAN) radio and a PAN radio according to one implementation. The graph 500 includes a first time window 502, a second time window 504, and a third time window 506. During the first time window 502, the WLAN radio transmits data (Tx data). During the second time window 504, the PAN radio receives data (PAN sink). During the third time window 506, the PAN radio scans for one or more advertisements from other devices (referred to as BLE scans when using BLE technology). As described herein, a single PAN radio is unable to perform scans continuously.

FIG. 5B illustrates a graph 520 of airtime with multiple windows of a WLAN radio and two PAN radios with continuous scan according to one embodiment. The graph 520 includes a first time window 522, a second time window 524, and a third time window 526. During the first time window 522, the WLAN radio transmits data (Tx data). During the second time window 524, a first PAN radio receives data (PAN sink) and a second PAN radio scans for one or more advertisements from other devices (referred to as BLE scans when using BLE technology). During the third time window 506, the first PAN radio can perform a PAN inquiry to listen for frame or packets from other devices and the second PAN radio scans for one or more advertisements (e.g., BLE scans). As described herein, the second PAN radio can perform continuous scans (BLE scans) during the airtime dedicated to the PAN radios. In some cases, the second PAN radio could be enabled to scan for advertisements while the WLAN radio is transmitted. In other cases, the first and second PAN radios are disabled.

Figure 6:
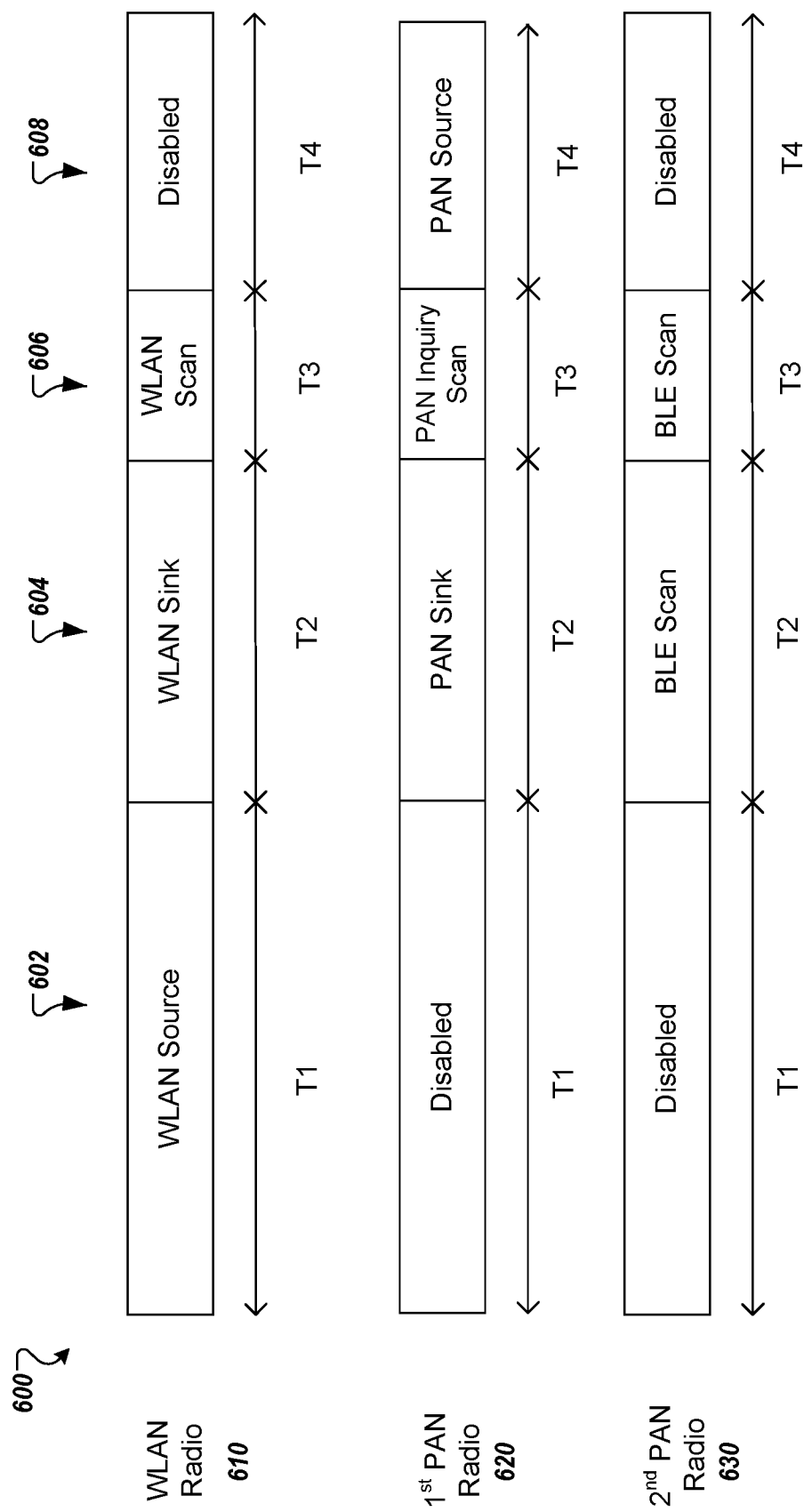
FIG. 6 illustrates a graph of airtime with multiple windows of a WLAN radio, a first PAN radio, and a second PAN radio with selective scan according to one embodiment.

FIG. 6 illustrates a graph 600 of airtime with multiple windows of a WLAN radio, a first PAN radio, and a second PAN radio with selective scan according to one embodiment. The graph 600 includes a first time window 602, a second time window 604, a third time window 606, and a fourth time window 608. During operation, a WLAN radio 610 transmits data (WLAN source) during the first time window 602, receives data (WLAN sink) during the second time window 604, scans for advertisements during the third time window 606, and is disabled during the fourth time window 608. A first PAN radio 620 is disabled during the first time window 602, receives data (PAN sink) during the second time window 604, performs PAN inquiry scans during the third time window 606, and transmits data (PAN source) during the fourth time window 608. A second PAN radio 630 is disabled during the first time window 602 because the WLAN radio 610 is transmitting data, scans for advertisements (BLE scan) during the second time window 604, scans for advertisements (BLE scan) during the third time window 606, and is disabled during the fourth time window 608 because the first PAN radio is transmitting data. During the second time window 604 and third time window 606, the second PAN radio scans for one or more advertisements from other devices (referred to as BLE scans when using BLE technology) as selective scans. It is selective scanning because the second PAN radio 630 is disabled during transmission of at least the first PAN radio 620.

In another embodiment, the second PAN radio 630 can be selectively disabled to achieve a target duty cycle value as described herein.

Figure 7:
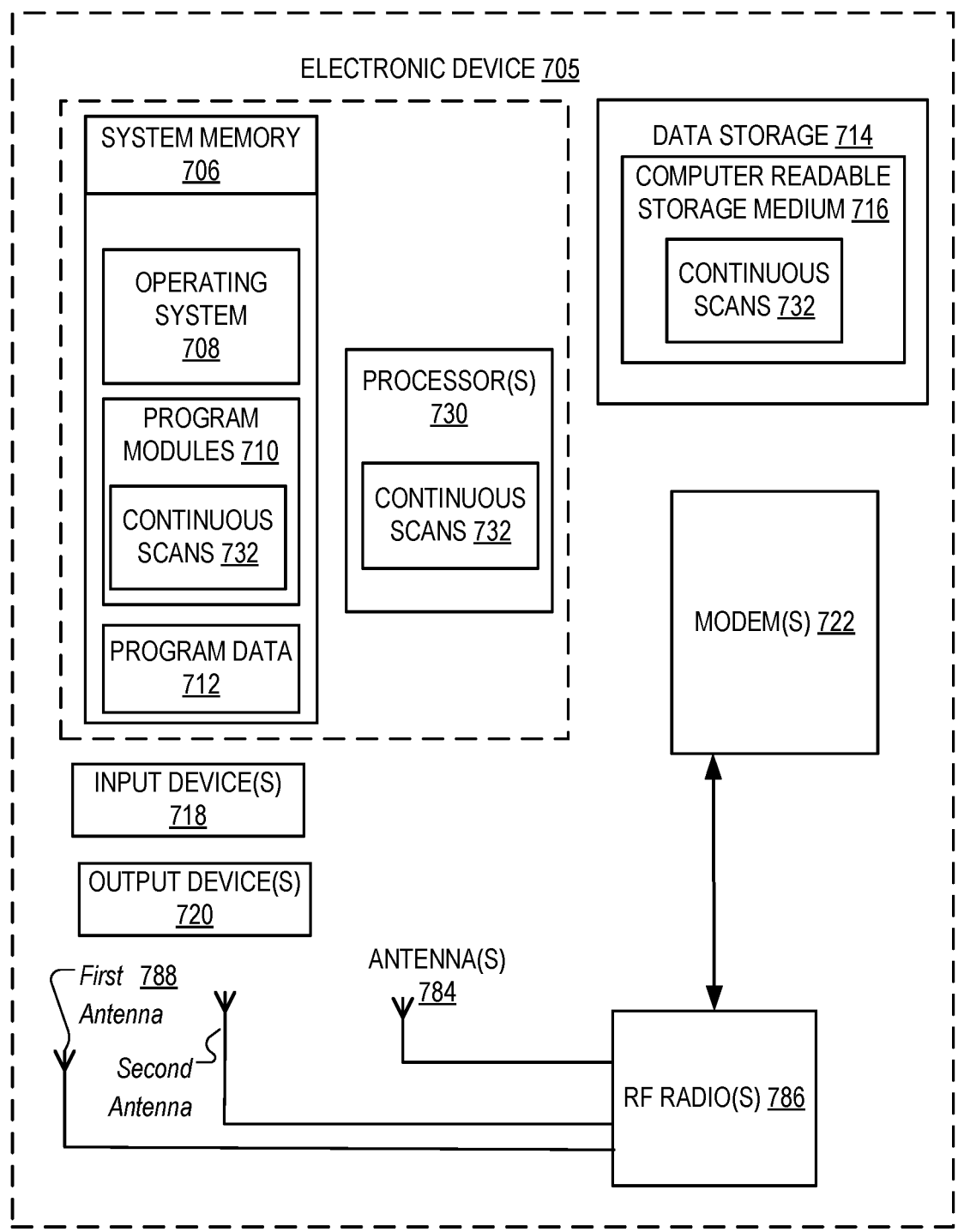
FIG. 7 is a block diagram of an electronic device in which embodiments of continuous scans may be implemented.

FIG. 7 is a block diagram of an electronic device 705 in which embodiments of continuous scans may be implemented. The electronic device 705 may correspond to the electronic device 100 of FIG. 1, electronic device 200 of FIG. 2, electronic device 300 of FIG. 3, or SoC 400 of FIG. 4. The electronic device 705 may be any type of computing device such as an electronic book reader, a PDA, a mobile phone, a laptop computer, a portable media player, a tablet computer, a camera, a video camera, a netbook, a desktop computer, a gaming console, a DVD player, a Bluray®, a computing pad, a media center, an audio-input-enabled device, a speech-based personal data assistant, and the like. The electronic device 705 may be any portable or stationary user device. For example, the electronic device 705 may be an intelligent voice control and speaker system. Alternatively, the electronic device 705 can be any other device used in a WLAN network (e.g., Wi-Fi® network), a WAN network, or the like.

The electronic device 705 includes one or more processor(s) 730, such as one or more CPUs, microcontrollers, field programmable gate arrays, or other types of processing devices. The electronic device 705 also includes system memory 706, which may correspond to any combination of volatile and/or non-volatile storage mechanisms. The system memory 706 stores information that provides operating system component 708, various program modules 710 such as the continuous scans 732 described herein, program data 712, and/or other components. In one embodiment, the system memory 706 stores instructions of the methods as described herein. The electronic device 705 performs functions by using the processor(s) 730 to execute instructions provided by the system memory 706.

The electronic device 705 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein, such as the continuous scans 732 described herein. Instructions for the program modules 710 may reside, completely or at least partially, within the computer-readable storage medium 716, system memory 706 and/or within the processor(s) 730 during execution thereof by the electronic device 705, the system memory 706 and the processor(s) 730 also constituting computer-readable media. The electronic device 705 may also include one or more input devices 718 (keyboard, mouse device, specialized selection keys, etc.) and one or more output devices 720 (displays, printers, audio output mechanisms, etc.).

The electronic device 705 further includes a modem 722 to allow the electronic device 705 to communicate via a wireless network (e.g., such as provided by the wireless communication system) with other computing devices, such as remote computers, an item providing system, and so forth. The modem 722 can be connected to RF radios 786. The RF radios 786 may be a WLAN radio, a WAN radio, PAN radio, or the like, as described herein. Antennas 788 are coupled to the RF radios 786, which is coupled to the modem 722. Zero or more antennas 784 can be coupled to one or more RF radios 786, which are also connected to the modem 722. The zero or more antennas 784 may be GPS antennas, NFC antennas, other WAN antennas, WLAN or PAN antennas, or the like. The modem 722 allows the electronic device 705 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 722 may generate signals and send these signals to antennas 788, and 784 via RF radios 786 as descried herein. Electronic device 705 may additionally include a WLAN radio, a GPS receiver, a PAN transceiver, and/or other RF radios. These RF radios may additionally or alternatively be connected to one or more of antennas 784, 788. Antennas 784, 788 may be configured to transmit in different frequency bands and/or using different wireless communication protocols. The antennas 784, 788 may be directional, omnidirectional, or non-directional antennas. In addition to sending data, antennas 784, 788 may also receive data, which is sent to appropriate RF radios connected to the antennas.

In one embodiment, the electronic device 705 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 722 is shown to control transmission and reception via antenna (784, 788), the electronic device 705 may alternatively include multiple modems, each of which is configured to transmit/receive data via a different antenna and/or wireless transmission protocol.

The electronic device 705 delivers and/or receives items, upgrades, and/or other information via the network. For example, the electronic device 705 may download or receive items from an item providing system. The item providing system receives various requests, instructions and other data from the electronic device 705 via the network. The item providing system may include one or more machines (e.g., one or more server computer systems, routers, gateways, etc.) that have processing and storage capabilities to provide the above functionality. Communication between the item providing system and the electronic device 705 may be enabled via any communication infrastructure. One example of such an infrastructure includes a combination of a wide area network (WAN) and wireless infrastructure, which allows a user to use the electronic device 705 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the electronic device 705.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices 705 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 705 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
   a memory buffer device;
   a personal area network (PAN) receiver to receive first radio frequency (RF) signals;
   a PAN transceiver to receive second RF signals;
   a Bluetooth® Low Energy (BLE) physical layer (PHY) device coupled to the PAN receiver and the memory buffer device, the BLE PHY device to process the first RF signals to obtain first data and store the first data in the memory buffer device, wherein the first data comprises one or more advertisement packets broadcast from another device, wherein an advertisement packet includes data that identifies the other device;

a Bluetooth® classic (BT Classic) PHY device coupled to the PAN transceiver to process the second RF signals to obtain second data, wherein the second data comprises Audio/Video (AV) content; and a media access control (MAC) device coupled to the memory buffer device and the BT PHY device, wherein the MAC device:
assigns a single MAC address to the BLE PHY device and the BT PHY device;
obtains the first data from the memory buffer device;
processes the first data, according to a first priority; and
receives the second data directly from the BT PHY device; and
processes the second data, according to a second priority, wherein the second priority is higher than the first priority.

2. The electronic device of claim 1, further comprising:
a processing device;
an antenna; and
a switch coupled to the antenna and the PAN receiver and selectively coupled to the PAN receiver, wherein the switch, when controlled to be in a first state by the processing device, enables the PAN receiver to receive the first RF signals via the antenna and the PAN transceiver to receive the second RF signals via the antenna, and wherein the switch, when controlled to be in a second state by the processing device, disables the PAN receiver to receive the first RF signals via the antenna and enables the PAN transceiver to transmit third RF signals via the antenna.

3. An apparatus comprising:
a processing device;
a memory device;
a first radio configured to obtain first data during a first time window and to scan for advertisement packets during a second time window;
a second radio coupled to the memory device, wherein the second radio is configured to scan for the advertisement packets during the first time window and the second time window to obtain second data, wherein the second data is stored in the memory device; and
a single media access control (MAC) device coupled to the memory device and the first radio, wherein the single MAC device is configured to:
assign a single MAC address to both the first radio and the second radio;
process the first data received from the first radio according to a first priority; and
process the second data retrieved from the memory device according to a second priority that is lower than the first priority.

4. The apparatus of claim 3, wherein the first radio comprises a first personal area network (PAN) PHY device and a first PAN transceiver, wherein the second radio comprises a second PAN PHY device and a second PAN receiver.

5. The apparatus of claim 4, wherein the first radio comprises a first wireless local area network (WLAN) physical layer device and the second radio comprises a second WLAN physical layer device.

6. The apparatus of claim 3, further comprising:
a switch coupled to the second radio; and
a single antenna coupled to the first radio and the switch.

7. The apparatus of claim 3, wherein the single MAC device comprises a scheduler, wherein the first radio is configured to:
receive a first signal from the scheduler; and
in response to the first signal, process first RF signals during the first time window to obtain the first data and to scan for the advertisement packets during the second time window, wherein the second radio is configured to:
receive a second signal from the scheduler; and
in response to the second signal, scan for the advertisement packets during the first time window and the second time window to obtain the second data.

8. The apparatus of claim 3, wherein the single MAC device comprises a scheduler, wherein the first radio is configured to:
receive a first signal from the scheduler;
receive a second signal from the scheduler;
in response to the first signal, process first RF signals during the first time window to obtain the first data and to scan for the advertisement packets during the second time window; and
in response to the second signal, transmit third RF signals during a third time window, wherein the second radio is configured to:
receive a third signal from the scheduler;
receive a fourth signal from the scheduler;
in response to the third signal, scan for the advertisement packets during the first time window and the second time window to obtain the second data, wherein the second data is stored in the memory device; and
in response to the fourth signal, disable scanning for the advertisement packets during the third time window.

9. The apparatus of claim 3, wherein the single MAC device comprises a scheduler configured to receive a target scan duty cycle value from a host device, wherein the first radio is configured to:
receive a first signal from the scheduler; and
in response to the first signal, process first RF signals during the first time window to obtain the first data and to scan for the advertisement packets during the second time window, wherein the second radio is configured to:
receive a second signal from the scheduler;
receive a third signal from the scheduler;
in response to the second signal, scan for the advertisement packets during a first portion of the first time window and during the second time window to obtain the second data, wherein the second data is stored in the memory device; and
in response to the third signal, disable scanning for the advertisement packets during a second portion the first time window, wherein the target scan duty cycle value is equal to a percentage of time of the first portion of the first time window and the second time window.

10. The apparatus of claim 3, further comprising an integrated circuit comprising:
the processing device;
the memory device;
the first radio, wherein the first radio comprises a first personal area network (PAN) physical layer device and a PAN transceiver;

the second radio, wherein the second radio comprises a second PAN physical layer device and a PAN receiver;
the single MAC device;
a wireless local area network (WLAN) MAC device coupled to the processing device;
a WLAN physical layer device coupled to the WLAN MAC device; and
a WLAN transceiver coupled to the WLAN physical layer device.

11. The apparatus of claim 3, further comprising:
a first integrated circuit comprising the first radio, wherein the first radio comprises a first personal area network (PAN) physical layer device and a PAN transceiver; and
a second integrated circuit comprising the second radio, wherein the second radio comprises a second PAN physical layer device and a PAN receiver.

12. An apparatus comprising:
a processing device;
a listen offload device;
a first radio;
a second radio coupled to the listen offload device;
a media access control (MAC) device coupled the first radio; and
a link layer device coupled to the listen offload device and the MAC device, wherein the MAC device is configured to process first data received from the first radio, wherein the listen offload device is configured to process second data, and wherein the second radio is configured to scan for advertisement packets during a first time window in which the first radio is configured to receive and process first RF signals and during a second time window in which the first radio is configured to scan for the advertisement packets to obtain the second data.

13. The apparatus of claim 12, wherein the first radio comprises a first personal area network (PAN) physical layer device and a first PAN transceiver, wherein the second radio comprises a second PAN physical layer device and a second PAN receiver.

14. The apparatus of claim 12, further comprising:
a switch coupled to the second radio; and
a single antenna coupled to the first radio and the switch.

15. The apparatus of claim 12, wherein the second radio is configured to:
receive a first signal from the listen offload device; and
in response to the first signal, scan for the advertisement packets during the first time window in which the first radio is configured to receive and process first RF signals and during the second time window in which the first radio is configured to scan for the advertisement packets to obtain the second data.

16. The apparatus of claim 12, wherein the second radio is configured to:
receive a first signal from the listen offload device;
receive a second signal from the listen offload device;
in response to the first signal, scan for the advertisement packets during the first time window in which the first radio is configured to receive and process the first RF signals and during the second time window in which the first radio is configured to scan for the advertisement packets to obtain the second data; and
in response to the second signal, disable scanning for the advertisement packets during a third time window in which the first radio transmits third RF signals.

17. The apparatus of claim 12, wherein the listen offload device is configured to receive a target scan duty cycle value from a host device, wherein the second radio is configured to:
receive a first signal from the listen offload device;
receive a second signal from the listen offload device;
in response to the first signal, scan for the advertisement packets during a first portion of the first time window in which the first radio is configured to receive and process the first RF signals and during the second time window in which the first radio is configured to scan for the advertisement packets to obtain the second data; and
in response to the second signal, disable scanning for the advertisement packets during a second portion the first time window, wherein the target scan duty cycle value is equal to a percentage of time of the first portion of the first time window and the second time window.

18. The apparatus of claim 12, wherein the first radio comprises a first wireless local area network (WLAN) physical layer device and the second radio comprises a second WLAN physical layer device.

19. The apparatus of claim 12, further comprising an integrated circuit comprising:
the processing device;
the listen offload device;
the first radio, wherein the first radio comprises a first personal area network (PAN) physical layer device and a PAN transceiver;
the second radio, wherein the second radio comprises a second PAN physical layer device and a PAN receiver;
the MAC device;
a wireless local area network (WLAN) MAC device coupled to the processing device;
a WLAN physical layer device coupled to the WLAN MAC device; and
a WLAN transceiver coupled to the WLAN physical layer device.

20. The apparatus of claim 12, further comprising:
a first integrated circuit comprising the first radio, wherein the first radio comprises a first personal area network (PAN) physical layer device and a PAN transceiver; and
a second integrated circuit comprising the second radio, wherein the second radio comprises a second PAN physical layer device and a PAN receiver.

* * * * *